(12) United States Patent
Dai

(10) Patent No.: US 8,521,929 B2
(45) Date of Patent: Aug. 27, 2013

(54) VIRTUAL SERIAL PORT MANAGEMENT SYSTEM AND METHOD

(75) Inventor: Dong-Yan Dai, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 341 days.

(21) Appl. No.: 12/940,007

(22) Filed: Nov. 4, 2010

(65) Prior Publication Data

US 2011/0307639 A1    Dec. 15, 2011

(30) Foreign Application Priority Data

Jun. 10, 2010    (CN) .......................... 2010 1 0196990

(51) Int. Cl.
*G06F 13/42*    (2006.01)
(52) U.S. Cl.
USPC ......................................... 710/105; 710/107
(58) Field of Classification Search
USPC ................................. 710/107, 105
See application file for complete search history.

(56) References Cited

U.S. PATENT DOCUMENTS

| | | | |
|---|---|---|---|
| 7,979,552 B1* | 7/2011 | Saraiya et al. | 709/226 |
| 2006/0168099 A1* | 7/2006 | Diamant | 709/217 |
| 2008/0201501 A1* | 8/2008 | Partani et al. | 710/60 |
| 2009/0172708 A1* | 7/2009 | Cho et al. | 719/328 |
| 2010/0169070 A1* | 7/2010 | Nishida | 703/24 |

* cited by examiner

*Primary Examiner* — Nimesh G Patel
(74) *Attorney, Agent, or Firm* — Altis Law Group, Inc.

(57) ABSTRACT

A system and a method for virtual serial port management include setting a virtual universal asynchronous receiver/transmitter (VUART) and a software multiplexer (MUX) and setting the VUART to perform functions corresponding to different values of the software MUX. The method further includes receiving commands sent to the server regularly and assigning a first predetermined value to the software MUX when the received command is not an Intelligent platform management interface (IPMI) command. The management method further includes assigning a second predetermined value to the software MUX when the received command is the IPMI command but not a serial over LAN (SOL) command, and assigning a third predetermined value to the software MUX when the received command is the SOL command.

15 Claims, 4 Drawing Sheets

VIRTUAL SERIAL PORT MANAGEMENT SYSTEM AND METHOD

BACKGROUND

1. Technical Field

Embodiments of the present disclosure relate to serial port technology, and in particular, to a virtual serial port management system and method.

2. Description of Related Art

Serial port assignation in a server based on a baseboard management controller (BMC), may require a serial port of a Super Input/Output (Super I/O) chip to be set as a serial port of an operating system (OS) of the server. For example, hardware multiplexers (MUXs) may switch the serial port of the super I/O chip and BMC serial port. Therefore, one super I/O chip and a plurality of hardware MUXs have to perform functions of a system serial port, a BMC serial port and a BMC serial over LAN (SOL). Accordingly, the cost of the super I/O chip and a plurality of hardware MUXs may be high, and power consumption of a main board of the server may also be increased.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, JAVA, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage system.

Figure 1:
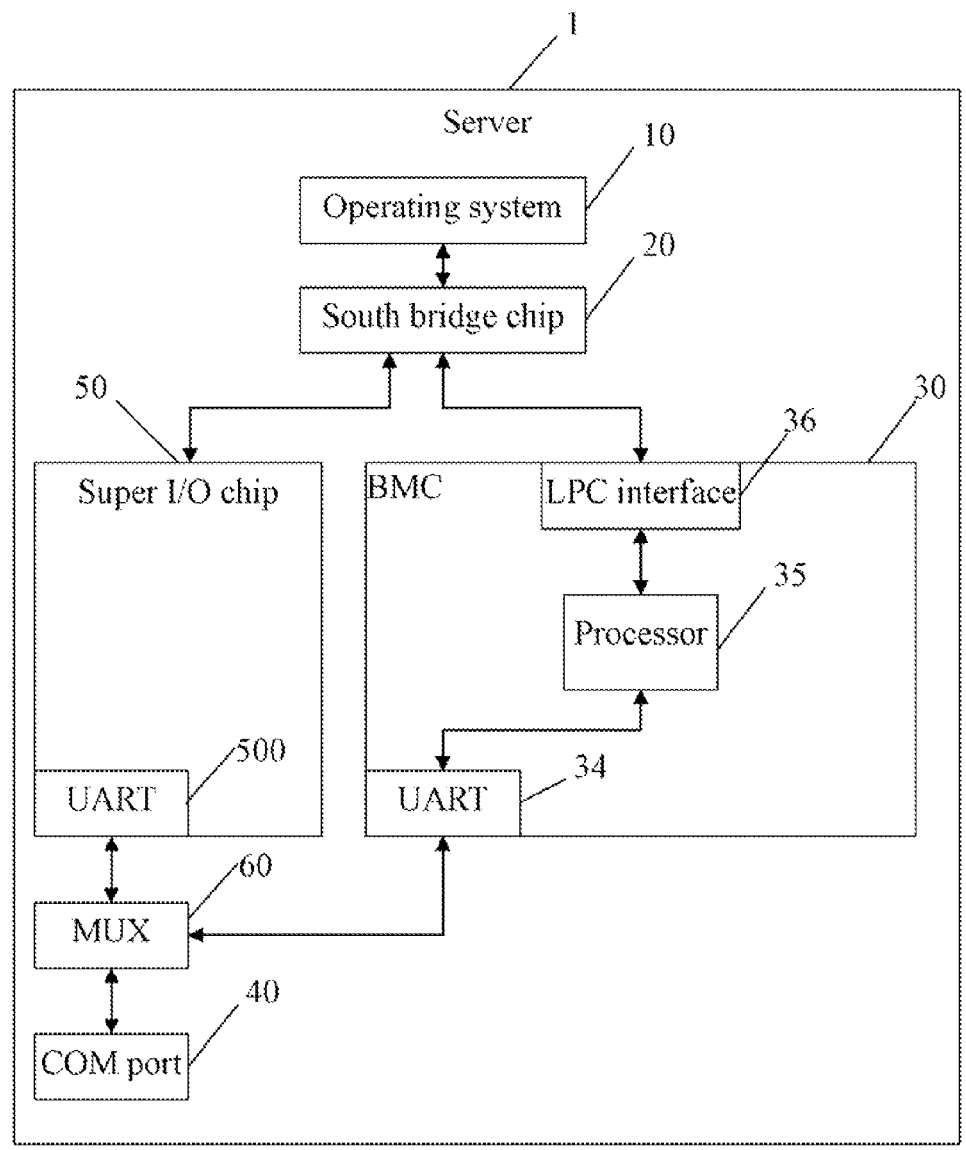
FIG. 1 is a schematic diagram of a first embodiment of a baseboard management controller.

FIG. 1 is a schematic diagram of a first embodiment of a baseboard management controller (BMC) 30 in a server 1. The server 1 includes an operating system (OS) 10, a Southbridge chip 20, a communication (COM) port 40, a super input/output (I/O) chip 50, and a hardware multiplexer (MUX) 60. The BMC 30 includes a Low Pin Count (LPC) interface 36, a processor 35 and a universal asynchronous receiver/transmitter (UART) 34. The super I/O chip 50 includes a UART 500. The hardware MUX 60 is a hardware component. The UART 500 may be set as a serial port of the OS 10 by the server 1. The hardware MUX 60 may be used to switch UART 500 and the UART 34. The sever 1 may use the Super I/O chip 50 and the hardware MUX 60 to perform functions of a system serial port, a BMC serial port and a BMC serial over LAN (SOL).

Figure 2:
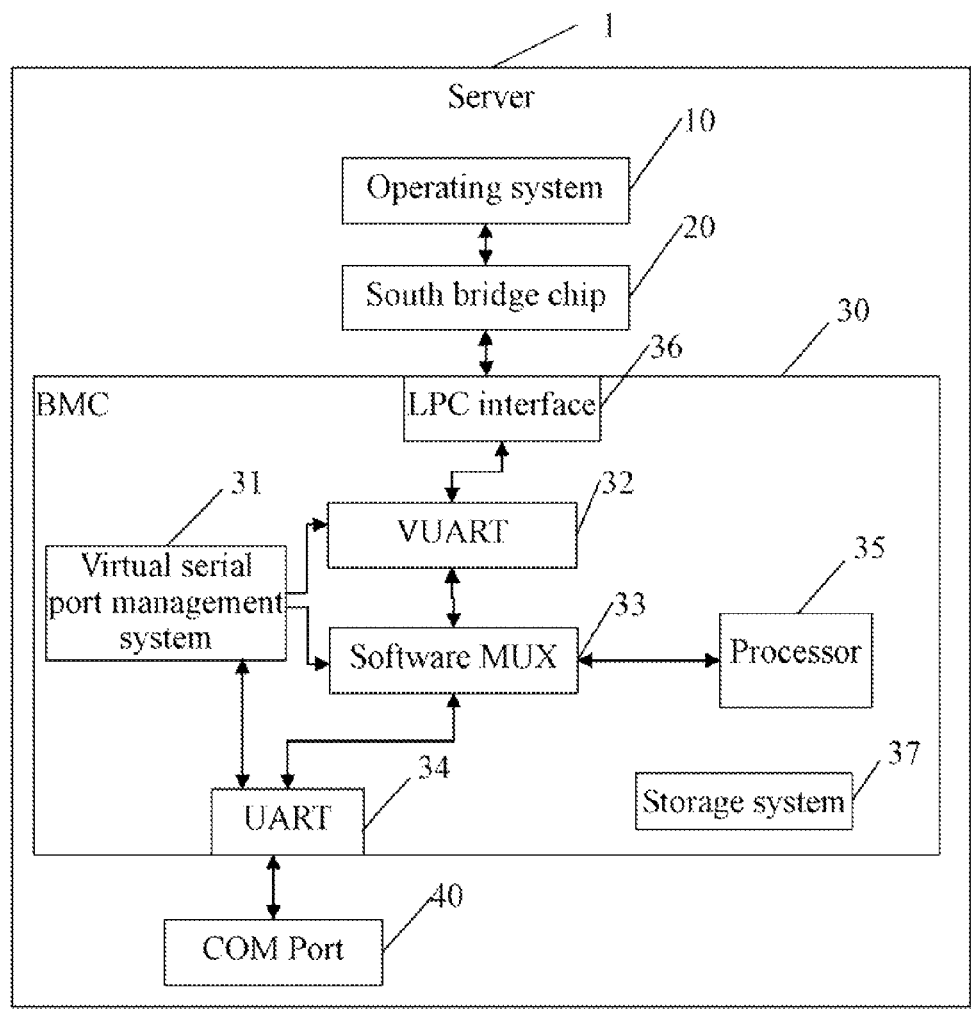
FIG. 2 is a schematic diagram of a second embodiment of a baseboard management controller including a serial port management system.

FIG. 2 is a schematic diagram of a second embodiment of the BMC 30 including a virtual serial port management system. As mentioned, the BMC 30 is run in the server 1. The server 1 also includes the OS 10, the Southbridge chip 20, and the COM port 40. In the second embodiment, the BMC 30 includes a virtual universal asynchronous receiver/transmitter (VUART) 32, a software MUX 33 and the virtual serial port management system 31, and the server 1 does not have the super I/O chip 50 and the hardware MUX 60. The virtual serial port management system 31 may use the VUART 32 and the software MUX 33 to perform the functions of the system serial port, the BMC serial port and the BMC SOL. Thus, the cost of the super I/O chip 50 and the hardware MUX 60 may be avoided, and the power consumption of a main board of the server also may be reduced.

In some embodiments, the BMC 30 also includes the UART 34, the processer 35 and a storage system 37. Detailed descriptions of BMC 30 are provided follow.

The VUART 32 is a virtual serial port established by the BMC 30. The VUART 32 is connected to the virtual serial port management system 31. The virtual serial management system 31 may perform functions of the system serial port, the BMC serial port and the BMC SOL by using the VUART 32. The system serial port has a function of a common computer serial port, such as to connect a printer or a serial port mouse, for example. The BMC serial port has a function of being an Intelligent Platform Management Interface (IPMI) serial channel in a predetermined IPMI standard. The BMC serial port provides a channel for other electronic devices (e.g., computer servers not shown in FIG. 1) to communicate with the BMC 30 in the server 1. For example, data and commands may be transmitted through the channel. The BMC SOL has a function of transmitting serial data in LAN and provides a remote console to access the serial port of other remote servers everywhere in the LAN.

The software MUX 33 is in communication with the VUART 32. The software MUX 33 is a virtual MUX established by the BMC 30. The BMC 30 may assign specific value to the software MUX 33 according to commands received by the BMC 30.

The UART 34 is a physical serial port of the BMC 30. The system serial port and BMC serial port both share the UART 34 through establishing virtual serial ports by the BMC 30. The processor 35 of the BMC 30 executes one or more computerized code of the BMC 30 and other applications, to provide the functions of the BMC 30. The storage system 37 may be a memory system of the BMC 30.

In some embodiments, the Southbridge chip 20 is in communication with the OS 10. The Southbridge chip 20 is further in communication with a Low Pin Count (LPC) interface 36 of the BMC 30 through a LPC bus (Not shown in FIG. 2). The BMC 30 is in communication with the COM port 40.

Figure 3:
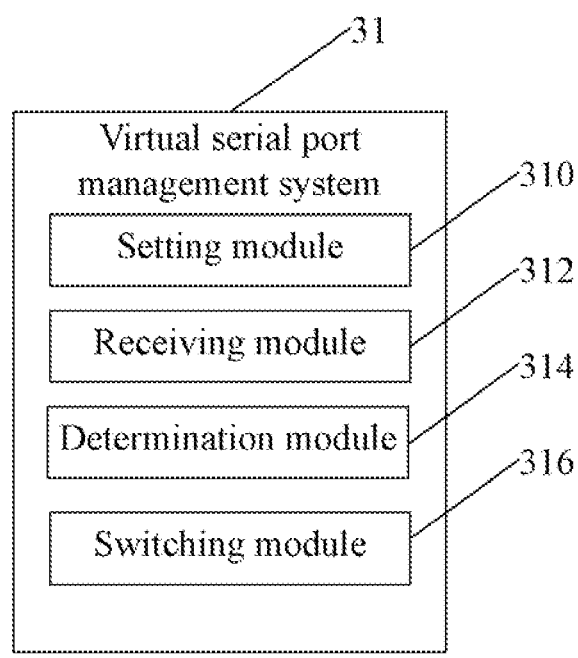
FIG. 3 is a block diagram of one embodiment of the virtual serial port management system of FIG. 2.

FIG. 3 is a block diagram of one embodiment of the virtual serial port management system 31 of FIG. 2. In some embodiments, the virtual serial port management system 31 includes a setting module 310, a receiving module 312, a determination module 314 and a switching module 316. The modules 310, 312, 314 and 316 may comprise computerized code in the form of one or more programs that are stored BMC 30. The computerized code includes instructions that are executed by the at least one processor 35 to provide functions for modules 310, 312, 314 and 316. Details of these operations are provided as follows.

The setting module 310 sets the VUART 32 and the software MUX 33, and sets that the VUART 32 performs the function of system serial port of the server 1 if the value of the software MUX is equal to the first predetermined value, such as 0. The setting module 310 further sets that the VUART 32 performs the function of the BMC serial port if the value of the software MUX is equal to the second predetermined value, such as 1, or performs the function of the BMC SOL if the value of the software MUX is equal to the third predetermined value, such as 2. The setting module 310 further sets an initial value of the software MUX 33 to be the first predetermined value, to make the OS 10 can communicate with other computer servers.

The receiving module 312 receives a command sent to the server 1 from the COM port 40. For example, the receiving module 312 may receive the commands at each 100 ms. The received command may be an IPMI command. The IPMI command is in accordance with the IPMI standard. The IPMI standard further defines SOL commands.

The determination module 314 determines whether the received command is the IPMI commands. In some embodiments, the determination module 314 determines that the received command is the IPMI command, if the received command is in accordance with the IPMI standard. For example, a command "IPMICmd 20 6 0 1" is in accordance with the IPMI standard of "Get Device ID," the determination module 314 determines that the command "IPMICmd 20 6 0 1" is the IPMI command.

If the received command is not the IPMI command, the switching module 316 assigns the first predetermined value to the software MUX 33, and directs the VUART 32 to perform the function of the system serial port. In some embodiments, a data stream of the VUART 32 to performing the function of the system serial port is transmitted according to an order of "the COM port 40-the UART 34-the software MUX 33-the VUART 32-the LPC interface 36-the Southbridge chip 20-the OS 10." The data stream may be transmitted bidirectionally. The BMC 30 may process data communication according to received command and corresponding data stream.

If received command is IPMI command, the determination module 314 further determines whether the received command is the SOL command. In some embodiments, the determination module 314 determines that the received command is the SOL commands, if the received command is in accordance with the SOL command in the IPMI standard. For example, a command "Ipmitool -I lan -H host -U user -a chassis power status" is in accordance with a SOL command of "Get a power status of a remote server", and the determination module 314 determines that the command "Ipmitool -I lan -H host -U user -a chassis power status" is the SOL command.

If the received command is not the SOL command, the switching module 316 assigns the second predetermined value to the software MUX 33, and directs the VUART 32 to perform the function of the BMC serial port. In some embodiments, a data stream of the VUART 32 to performing the function of the BMC serial port is transmitted according to an order of "the COM port 40-the UART 34-the software MUX 33-the processor 35." As mentioned above, the data stream may be transmitted bidirectionally and the BMC 30 may process data communication according to the received command and corresponding data stream.

If the received command is the SOL command, the switching module 316 assigns the third predetermined value to the software MUX 33, and directs the VUART 32 to perform the function of the BMC SOL. In some embodiments, a data stream to performing the function of the BMC SOL is the "OS 10-the Southbridge chip 20-the LPC interface 36-the VUART 32-the software MUX 33-the processor 35." The data stream may be transmitted bidirectionally and the BMC 30 may process data communication according to received command and corresponding data stream.

The determination module 314 further determines whether a type of the received command is the same as the type of the previous received command. In some embodiments, the type of the received command may include the IPMI command, the SOL command and not the IPMI command. If the received command is the IPMI command and the previous received command is the SOL command, the determination module 314 determines that the type of the received command is different from the type of the previous received command, and the switching module 316 may assign the specific value to the software MUX 33 corresponding to the received command. If the received command is the IPMI command and the previous received command is also the IPMI command, the determination module 314 determines that the type of the received command is the same as the type of the previous received command.

Figure 4:
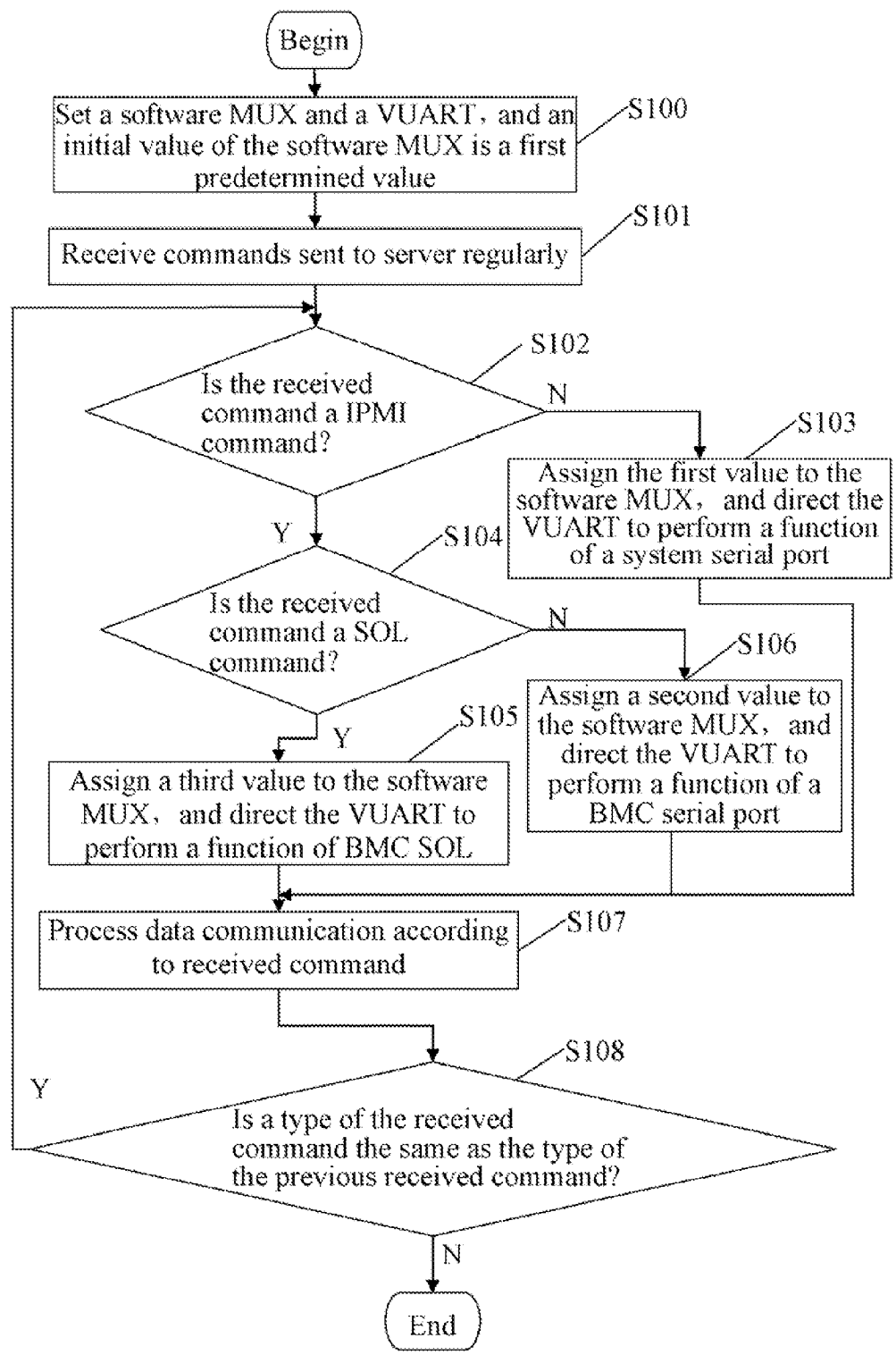
FIG. 4 is a flowchart of one embodiment of a method for managing virtual the serial port in a baseboard management controller of FIG. 2.

FIG. 4 is a flowchart of one embodiment of a method for managing virtual the serial port in a baseboard management controller of FIG. 2. Depending on the embodiment, additional blocks may be added, others removed, and the ordering of the blocks may be changed.

In block S100, the setting module 310 sets the VUART 32 and the software MUX 33, and sets an initial value of the software MUX 33 is equal to the first predetermined value, to make the OS 10 can communicate with other servers.

In block S101, the receiving module 312 receives a command sent to the server 1 from the COM port 40 regularly.

In block S102, the determination module 314 determines whether the received command is the IPMI command.

If the received command is not the IPMI command, in block S103, the switching module 316 assigns the first predetermined value to the software MUX 33 to be 0, and directs the VUART 32 to perform the function of the system serial port, and block S107 is implemented.

If the received command is the SOL command, in block S104, the determination module 314 determines whether the received command is the SOL command.

If the received command is the SOL command, in block S105, the switching module 316 assigns the third predetermined value to the software MUX 33, and directs the VUART 32 to perform the function of the BMC SOL, and block S107 is repeated.

If the received command is not the SOL command, in block S106, the switching module assigns the second predetermined value to the software MUX 33, and directs the VUART 32 to perform the function of the BMC serial port.

In block S107, the BMC 30 may process data communication according to received command and corresponding data stream.

In block S108, the determination module 314 further determines whether a type of the received command is the same with the type of the previous received command. In some embodiments, the type of the received command may include the IPMI command, the SOL command and not the IPMI command. If the type of the received command is the different from the type of the previous received command, the procedure returns to the block S102, and if the type of the received command is the same with the type of the previous received command, the procedure is end.

It should be emphasized that the described inventive embodiments are merely possible examples of implementations, and set forth for a clear understanding of the principles of the present disclosure. Many variations and modifications may be made to the-described inventive embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. A baseboard management controller (BMC) in a server, the BMC comprising:
   a storage system;
   at least one processor; and
   one or more programs stored in the storage system, executable by the at least one processor, the one or more programs comprising:
   a setting module operable to set a virtual universal asynchronous receiver/transmitter (VUART) and a software multiplexer (MUX) which is virtual, and set the VUART to perform different functions under the condition that the software MUX is assigned to different values, wherein the functions performed by the VUART comprise a function of a system serial port of the server, a function of a BMC serial port, and a function of a BMC serial over LAN (SOL), and the values assigned to the software MUX comprise a first predetermined value, a second predetermined value, and a third predetermined value;
   a receiving module operable to receive a command sent to the server;
   a switching module operable to assign the first predetermined value to the software MUX to direct the VUART to perform the function of the system serial port if the received command is not in accordance with a predetermined Intelligent platform management interface (IPMI) standard.

2. The BMC as claimed in claim 1, wherein the VUART performs the function of the BMC serial port under the condition that the value of the software MUX is equal to the second predetermined value.

3. The BMC as claimed in claim 2, wherein the switching module is further operable to assign the second predetermined value to the software MUX to direct the VUART to perform the function of the BMC serial port if the received command is in accordance with the IPMI standard and not in accordance with a predetermined serial over LAN (SOL) command in the IPMI standard.

4. The BMC as claimed in claim 1, wherein the setting module is further operable to set the VUART to perform a function of the BMC (SOL) under the condition that the value of the software MUX is equal to the third predetermined value.

5. The BMC as claimed in claim 4, wherein the switching module is further operable to assign the third predetermined value to the software MUX to direct the VUART to perform the function of the BMC SOL if the received command is in accordance with the IPMI standard and in accordance with the SOL command.

6. A computer-implemented method for managing a virtual serial port of a server, the server comprising a baseboard management controller (BMC), the method comprising:
   setting a virtual universal asynchronous receiver/transmitter (VUART) and a software multiplexer (MUX) which is virtual, and setting the VUART to perform different functions under the condition that the software MUX is assigned to different values, wherein the functions performed by the VUART comprise a function of a system serial port of the server, a function of a BMC serial port, and a function of a BMC serial over LAN (SOL), and the values assigned to the software MUX comprise a first predetermined value, a second predetermined value, and a third predetermined value;
   receiving a command sent to the server;
   assigning the first predetermined value to the software MUX to direct the VUART to perform the function of the system serial port, under the condition that the received command is not in accordance with a predetermined Intelligent platform management interface (IPMI) standard.

7. The method as claimed in claim 6, further comprising:
   setting the VUART to perform the function of the BMC serial port, under the condition that the value of the software MUX is equal to the second predetermined value.

8. The method as claimed in claim 7, further comprising:
   assigning the second predetermined value to the software MUX to direct the VUART to perform the function of the BMC serial port, under the condition that the received command is in accordance with the IPMI standard and not in accordance with a predetermined SOL command in the IPMI standard.

9. The method as claimed in claim 6, further comprising:
   setting the VUART to perform the function of the BMC serial over LAN (SOL), under the condition that the value of the software MUX is equal to the third predetermined value.

10. The method as claimed in claim 9, further comprising:
    assigning the third predetermined value to the software MUX to direct the VUART to perform the function of the BMC SOL, under the condition that the received command is in accordance with the IPMI standard and in accordance with the SOL command.

11. A non-transitory storage medium storing a set of instructions, the set of instructions capable of executed by a processor to perform a method for managing a virtual serial port of a server, the server comprising a baseboard management controller (BMC), the method comprising:
    setting a virtual universal asynchronous receiver/transmitter (VUART) and a software multiplexer (MUX) which is virtual, and setting the VUART to perform different functions under the condition that the software MUX is assigned to different values, wherein the functions performed by the VUART comprise a function of a system serial port of the server, a function of a BMC serial port, and a function of a BMC serial over LAN (SOL), and the values assigned to the software MUX comprise a first predetermined value, a second predetermined value, and a third predetermined value;
    receiving a command sent to the server;
    assigning the first predetermined value to the software MUX to direct the VUART to perform the function of the system serial port, under the condition that the received command is not in accordance with a predetermined Intelligent platform management interface (IPMI) standard.

12. The non-transitory storage medium as claimed in claim 11, further comprising:
    setting the VUART to perform the function of the BMC serial port, under the condition that the value of the software MUX is equal to the second predetermined value.

13. The non-transitory storage medium as claimed in claim 12, further comprising:
    assigning the second predetermined value to the software MUX to direct the VUART to perform the function of the BMC serial port, under the condition that the received command is in accordance with the IPMI standard and not in accordance with a predetermined SOL command in the IPMI standard.

14. The non-transitory storage medium as claimed in claim 11, further comprising:
setting the VUART to perform the function of the BMC serial over LAN (SOL), under the condition that the value of the software MUX is equal to the third predetermined value.

15. The non-transitory storage medium as claimed in claim 14, further comprising:
assigning the third predetermined value to the software MUX to direct the VUART to perform the function of the BMC SOL, under the condition that the received command is in accordance with the IPMI standard and in accordance with the SOL command.

* * * * *